US008658038B2

(12) United States Patent
Rustamov et al.

(10) Patent No.: US 8,658,038 B2
(45) Date of Patent: Feb. 25, 2014

(54) PH STABLE CHROMATOGRAPHIC MEDIA USING TEMPLATED MULTILAYER ORGANIC/INORGANIC GRAFTING

(75) Inventors: Ismail M. Rustamov, Torrance, CA (US); Michael C. Chitty, Torrance, CA (US); Tivadar Farkas, Torrance, CA (US); Lawrence Loo, Torrance, CA (US); Emmet Welch, Torrance, CA (US)

(73) Assignee: Phenomenex, Inc., Torrance, CA (US)

( * ) Notice: Subject to any disclaimer, the term of this patent is extended or adjusted under 35 U.S.C. 154(b) by 1275 days.

(21) Appl. No.: 12/494,691

(22) Filed: Jun. 30, 2009

(65) Prior Publication Data

US 2009/0275469 A1 Nov. 5, 2009

Related U.S. Application Data

(63) Continuation of application No. 11/240,695, filed on Sep. 30, 2005, now Pat. No. 7,563,367.

(60) Provisional application No. 60/615,093, filed on Oct. 1, 2004, provisional application No. 60/615,812, filed on Oct. 4, 2004.

(51) Int. Cl.
*B01D 15/08* (2006.01)

(52) U.S. Cl.
USPC ...... 210/656; 210/198.2; 210/635; 210/502.1

(58) Field of Classification Search
USPC ................... 210/635, 656, 659, 198.2, 502.1; 502/401, 439
See application file for complete search history.

(56) References Cited

U.S. PATENT DOCUMENTS

| 4,421,650 | A | 12/1983 | Nagasawa et al. |
| 4,746,572 | A | 5/1988 | Glajch et al. |
| 5,616,754 | A | 4/1997 | Cruse et al. |
| 5,750,197 | A | 5/1998 | Van Ooij et al. |
| 5,759,629 | A | 6/1998 | Van Ooij et al. |
| 5,869,152 | A | 2/1999 | Colon |
| 6,074,555 | A | 6/2000 | Boos et al. |
| 6,488,855 | B2 | 12/2002 | Gjerde et al. |
| 6,686,035 | B2 | 2/2004 | Jiang et al. |
| 6,794,044 | B2 | 9/2004 | Jones et al. |
| 7,374,684 | B2 | 5/2008 | Bigson et al. |

FOREIGN PATENT DOCUMENTS

WO 03080894 10/2003

OTHER PUBLICATIONS

Snyder; Introduction to Modern Liquid Chromatography, John Wiley & Sons, Inc., New York, 1979, pp. 272-278.
Mike's Laboratory Handbook of Chromatographic and Allied Methods, John Wiley & Sons, Inc., New York, 1979, pp. 157-159.

(Continued)

*Primary Examiner* — Ernest G Therkorn
(74) *Attorney, Agent, or Firm* — Stetina Brunda Garred & Brucker; Lowell Anderson

(57) ABSTRACT

An advanced silica gel sorbent for use in chromatographic separations that has been chemically modified by surface polycondensation of a trifunctional and/or difunctional organosilane. The chromatographic media exhibits a wider pH range and improved pH stability as compared to other silica gel based sorbents, while retaining all other positive aspects attributed to silica gel based sorbents. A method of forming the advanced silica gel sorbent by Templated Multilayer Inorganic/Organic Grafting.

9 Claims, 6 Drawing Sheets

Graphical representation of multilayer inorganic/organic surface grafted silica gel.

(56) References Cited

OTHER PUBLICATIONS

Subramanian & Van Ooij; Effect of the amine functional group on corrosion rate of iron coated with films of organo-functional silanes; Corrosion; Mar. 1998; 204-215.

Van Ooij and Child; Protecting metals with silane coupling agents; American Chemical Society; Feb. 1998; 26-35.

Loy; Development of new hybrid organic-inorganic materials for hydrogen separation membranes at Sandia National Laboratories; Rec'd Sep. 15, 2000; 33 pages.

Loy et al.; Substituent effects on the Sol-Gel chemistry of Organo-trialkosysilanes; Manuscript for "Chemistry of Materials"; Rec'd Jun. 6, 2000; 33 pages.

Kuroda, et al.; Formation of ordered silica-organic hybrids by self-assembly of hydrolyzed organo-alkoxysilanes with long organic chains; Mat. Res. Soc. Symp. Proc. vol. 703; 2002; p. 70-83.

Major & Blanchard; Strategies for covalent multilayer growth. 1; Polymer design & characterization; Chem. Mater.; 2002; p. 2567-2573.

Major & Blanchard; Strategies for covalent multilayer growth. 2; Interlayer linking chemistry; Chem. Mater.; 2002; p. 2574-2581.

Kobayashi, et al.; Synthesis & characterization of a polymer-coated C18 stationary phase with high carbon content for liquid chromatography; Journal of Chromatography; 1998; p. 75-81.

Kobayashi, et al.; Synthesis of multilayered silica-based hybrid films from difunctional organo-silanes by co-hydrolysis & polycondensation with tetra-alkoxysilane; Journal of Organometallic Chemistry; 2003; p. 223-227.

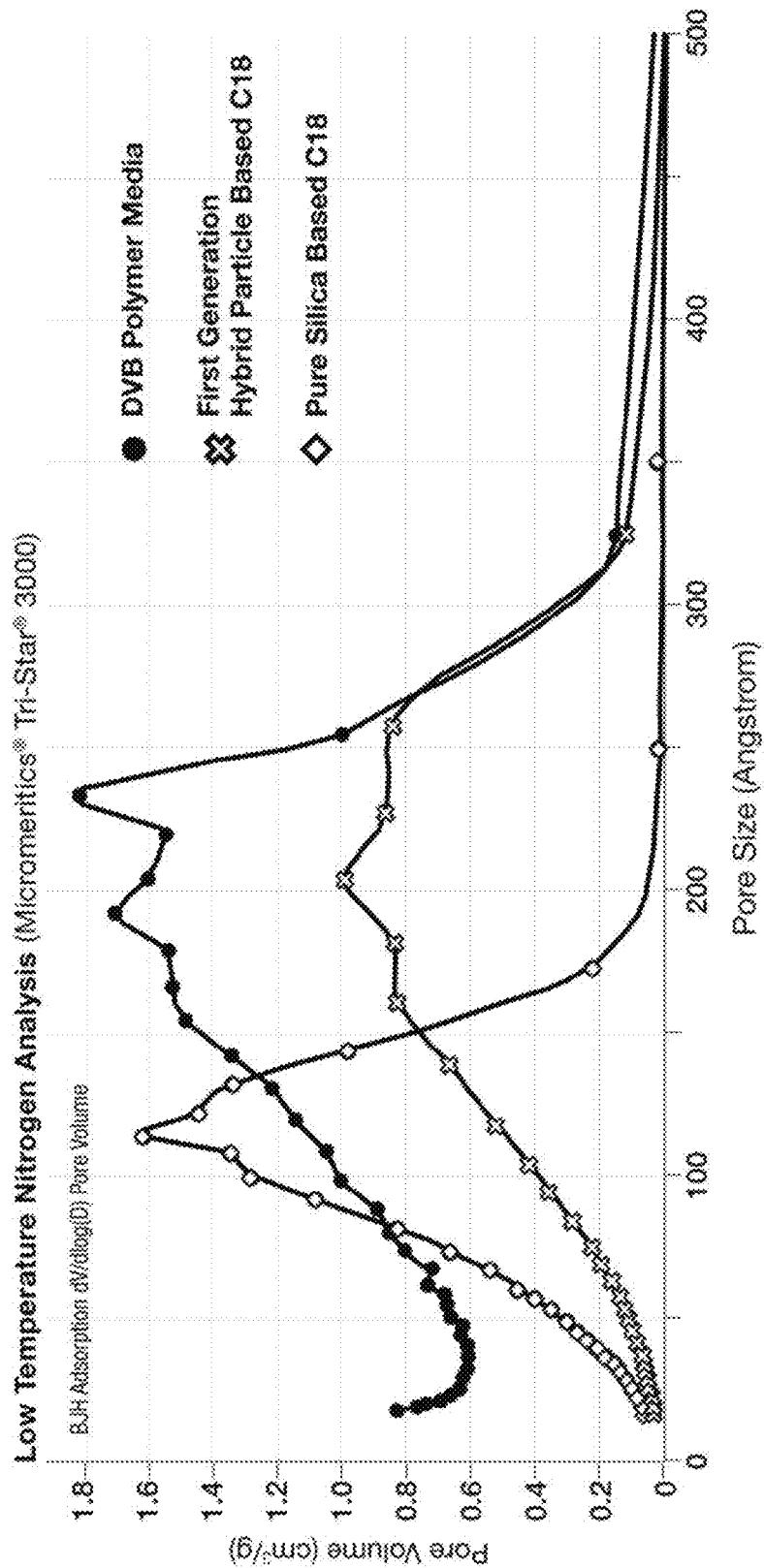

Pore size distribution of TMIOG silica based C18, first generation hybrid particle based C18 and second generation bridged hybrid particle based C18 media.

Graphical representation of multilayer inorganic/organic surface grafted silica gel.

PH STABLE CHROMATOGRAPHIC MEDIA USING TEMPLATED MULTILAYER ORGANIC/INORGANIC GRAFTING

CROSS-REFERENCE TO RELATED APPLICATIONS

The present patent application is a continuation of U.S. patent application Ser. No. 11/240,695, filed Sep. 30, 2005, entitled PH STABLE CHROMATOGRAPHIC MEDIA USING TEMPLATED MULTILAYER ORGANIC/INORGANIC GRAFTING, now U.S. Pat. No. 7,563,367, which claims priority to U.S. Provisional Application No. 60/615,093 filed on Oct. 1, 2004 and U.S. Provisional Application No. 60/615,812 filed on Oct. 4, 2004, the disclosures of all above-identified applications are expressly incorporated herein by reference.

STATEMENT RE: FEDERALLY SPONSORED RESEARCH/DEVELOPMENT

Not Applicable

BACKGROUND

An area of continual focus for HPLC column improvement has been increased pH stability. Flexibility to operate a column over a wide pH range provides another dimension of control in the separation of ionizable compounds, a class which a vast majority of small molecule drug compounds fall into, and has become a valuable tool for chromatographers. By altering the pH of the mobile phase, the charge on many ionizable compounds can be altered, in turn altering the retention of the compound, hence the selectivity of the column. This allows "tuning" of the separation to meet specific requirements. As shown in FIG. 1, use of high pH for basic drugs in particular, can improve their retention and selectivity.

Column manufacturers, and academia, have spent great efforts to improve the pH stability of silica-based media. As unmodified silica is inherently unstable and begins to dissolve near and above pH 7, a multitude of surface chemistry processes like bonding, coating, and endcapping have been employed to "shield" the silica from the harmful effects of higher pH mobile phases with some degree of success. Other strategies have led to the exploration of polymer-based sorbents, which are stable over the entire pH range. However, polymer based HPLC sorbents suffer from poor physical morphology due to wide pore size distribution, numerous micropores, and low mechanical and structural stability when compared to their silica counterparts. These deficiencies generally result in mobile phase limitations, poor column and separation efficiencies, limiting their use in high-performance applications.

The following publications are considered to be related to the field of the present invention and are hereby expressly incorporated by reference in their entireties:
1. L. Sander and S. Wise, Synthesis and Characterization of Polymeric C18 Stationary Phases for Liquid Chromatography, Anal. Chem. 1984, 56, 504-510.G.
2. G. Schomburg et al. Immobilization of Stationary Liquids on Silica Particles by y-Radiation, Chromatographia Vol. 18, 5, 1984, 265-274
3. Y. Ohutsu et al., Structures and Chromatographic Characteristics of capsule-Type Silica Gels Coated with Hydrophobic Polymers in RPLC, Chromatographia Vol. 24, 1987, 380-384
4. G. Schomburg, Polymer Coating of Surfaces in Column Liquid Chromatography and Capillary Electrophoresis, Trends in Analytical Chemistry, Vol. 10, 5, 1991, 163-169
5. M. Hanson et al., Review. Polymer-coated Reversed Phase Packings in HPLC, Journal of Chromatography A, 656 (1993), 369-380
6. S. Kobayashi et al., Synthesis and Characterization of a Polymer-coated c18 Stationary Phases with High Carbon Content for LC, Journal of Chromatography A, 828 (1998), 75-81
7. N. Umeda et al., Synthesis of Multilayered Silica-based Hybrid Films from Difunctional Organosilanes by Co-Hydrolysis and Polycondensation with Tetraethoxysilane, Journal of Organometallic Chemistry, Vol. 686, 1-2, 2003, 223-227
8. D. Mochizuki et al., Molecular Manipulation of Two- and Three-Dimensional Silica Nanostructures by Alkoxysilylation of Layered Silacate Octosilicate and Subsequent Hydrolysis of Alkoxy Groups, Journal of ACS, 2005

The following patents are likewise considered to be related to the field of the present invention and are hereby expressly incorporated by reference in their entireties: U.S. Pat. No. 4,539,061; U.S. Pat. No. 5,376,172; U.S. Pat. No. 6,261,357; U.S. Pat. No. 6,686,035; and WO 03/089106 A2.

Inorganic/Organic Hybrid media, sometimes referred to as "Hybrids" are composite materials, which incorporate both Inorganic and Organic components in order to provide advantageous properties not found in these materials individually. More recently, Hybrid materials have been explored for use as an HPLC medium with the hopes of bringing the best of both platforms to HPLC—the superior physiochemical morphology and mechanical strength of inorganic silica, and the pH stability and ionic inertness of organic polymers. One current HPLC column is disclosed in U.S. Pat. No. 6,686,035. This column is based on a porous "pure" first generation inorganic/organic hybrid particle formed by conventional sol-gel routes incorporating organic groups, namely methyl ($-CH_3$), throughout its silica lattice base structure, and surface modified by bonding with varying alkyl silanes by conventional means. Incorporation of methyl organic groups yields some properties of a polymer-based media, providing resistance to degradation at high pH.

While this approach of a pure hybrid particle has yielded improved pH stability over many purely silica-based media, the technology has also introduced some polymer-like drawbacks such as lower efficiency, larger peak tailing, reduced mechanical strength, and higher backpressure as compared to silica-based media of similar particle and pore size. Some of the above-mentioned shortcomings, at least partially, can be attributed to wider pore size distributions compared to silica based media/phases as shown in FIG. 2a. Additionally, much of the organic component can remain entrapped and as a result unutilized (wasted) within the walls of the particle (interior) as opposed to being concentrated at the surface where hydrolysis first begins to occur during exposure to high pH. Essentially, these "entrapped" methyl groups will not contribute to reduced dissolution until media has already been damaged to the point of complete or significant loss of performance. At the same time, the presence of single-bond-attached (hanging) methyl groups, and correlated to them, isolated silanol groups in the fully coordinated silicon-oxygen lattice of the walls brings an element of heterogeneity to the otherwise homogenous silica gel structure that in turn results in reduced mechanical and structural stability of the whole particle. In addition, the abovementioned isolated silanol groups while being sterically hindered to an effective end-capping reaction may still actively interact with the small molecules of some analytes.

The '035 patent discloses another HPLC product. This product is based on a porous inorganic/organic hybrid particle formed by conventional sol-gel routes incorporating organic ethane (—CH$_2$—CH$_2$—) bridges throughout its silica lattice base structure, and surface derivatized with varying alkyl phases by conventional means. This approach of ethane bridged organic/inorganic hybrid particle dramatically alleviated some problems associated with the previously described product. The introduction of bridged chemistry that anchors an ethane molecule on both its sides to neighboring silicon atoms, improves overall structural strength (as opposed to the previous product) because of the absence of single-bond-attached (hanging) organic moiety and corresponding silanol groups. Nonetheless, this chemistry still carries an element of heterogeneity throughout the particle. There are still unutilized interior organic moieties scattered throughout the silicon-oxygen lattice that are away from a chromatographically active surface and consequently cannot contribute to its hydrolytic stability. Apart from the above-mentioned, this new HPLC product has still somewhat higher backpressures, lower efficiencies, and larger peak tailing when compared to state-of-the-art silica based HPLC columns in the same category. This may again be attributed to a wider pore size distributions compared to silica-based media/phases as shown in FIG. 2b.

Thus, there remains a need for a high-performance chromatographic media that retains the near ideal physical morphology and strength of silica, while providing pH stability and inertness to ionic interactions closer to that of a polymer.

BRIEF SUMMARY

The present invention is directed to a chromatographic media comprising a silica gel sorbent. The sorbent has one or more chemical modifiers present on its surface. The chemical modifiers are trifunctional or difunctional organosilanes. The silica gel sorbent may be porous or non-porous silica particles, membranes, monolithic supports, fused capillaries, or silicon and glass wafers having silanols on their surface. The organosilanes may have the formula $R^1_a R^2_b SiX_{4-a-b}$ or $R(R^1_a SiX_{3-a})_n$, wherein R is a substituted aliphatic, cyclic, arylic or aromatic organic moiety containing 1 to 8 carbon atoms; $R^1$ and $R^2$ are organic ligands containing 1 to 4 carbon atoms; X is a leaving group attached to the silicon atom; a and b are positive integers equal to 0 or 1; a plus b equals to 1 or 2 but never 0; and n is a positive integer between 2 to 8. In a preferred embodiment, R may be an unsubstituted aliphatic, cyclic, arylic or aromatic organic moiety containing 1 to 8 carbon atoms. In a more preferred embodiment, R is an unsubstituted, saturated aliphatic organic moiety containing 1 to 8 carbon atoms. In another preferred embodiment, R contains 1 to 3 carbon atoms. In yet another preferred embodiment, $R^1$ and $R^2$ contain 1 to 2 carbon atoms.

The leaving group X may be Cl, OCH$_3$, OC$_2$H$_5$, (CH$_3$)$_2$N, (CH$_3$CH$_2$)$_2$N, I, Br, CN, OOCH$_3$, O(CO)CH$_3$, or O$_3$SCF$_3$. In a preferred embodiment, n is equal to 2. The chromatographic media may further comprise additional organosilanes having the formula $R^1 SiX_3$, $R^1 R^2 SiX_2$, or $R^1 R^2_2 SiX$, wherein $R^1$ and $R^2$ are organic ligands.

The present invention is also directed to a method of forming a silica gel sorbent for use in chromatographic separations that has been chemically modified by surface polycondensation of an inorganic/organic modifier. The method includes the following steps: reacting anhydrous silica gel sorbent with an inorganic/organic modifier; hydrolyzing any unreacted leaving groups; and dehydrating the sorbent. The inorganic/organic modifier has the formula $R^1_a R^2_b SiX_{4-a-b}$ or $R(R^1_a SiX_{3-a})_n$, wherein R is a substituted aliphatic, cyclic, arylic or aromatic organic moiety containing 1 to 8 carbon atoms or an unsubstituted aliphatic, cyclic, arylic or aromatic organic moiety containing 1 to 8 carbon atoms, $R^1$ and $R^2$ are organic ligands containing 1 to 4 carbon atoms, X is a leaving group attached to the silicon atom, a and b are positive integers equal to 0 or 1, a plus b equals to 1 or 2 but never 0, and n is a positive integer between 2 to 8. In a preferred embodiment, the method is performed 2 to 15 times. In a more preferred embodiment, the method is performed 2 to 4 times.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 2a shows the pore size distribution of divinylbenzene polymer based media, first generation hybrid particle based C18, and pure silica based C18 media;

DETAILED DESCRIPTION

The present invention relates to advanced silica gel sorbents for use in chromatographic separations that are chemically modified by surface polycondensation of an inorganic/organic composition. The silica gel sorbent or substrate can be any porous or non-porous silica particle, membrane, monolithic support, fused capillary, silicon or glass wafer with silicon-hydroxyl groups (silanols) on its surface. The chemical inorganic/organic modifier can be any trifunctional and/or difunctional organosilane of the following general formula $R^1_a R^2_b SiX_{4-a-b}$ or $R(R^1_a SiX_{3-a})_n$, where R is a substituted or unsubstituted aliphatic, cyclic, arylic or aromatic, but preferably unsubstituted, saturated aliphatic organic moiety containing 1-8 but preferably 1-3 carbon atoms, $R^1$ and $R^2$ are organic ligands containing 1-4 but preferably 1-2 carbon atoms, X is a leaving group attached to the silicon atom, for instance, Cl, OCH$_3$, OC$_2$H$_5$, (CH$_3$)$_2$N, (CH$_3$CH$_2$)$_2$N, I, Br, CN, OOCH$_3$, O(CO)CH$_3$, O$_3$SCF$_3$, where a and b are positive integers equal to 0 or 1, and a plus b equals to 1 or 2 but never 0, n is a positive integer equal to 2-8 but preferably 2.

The chemical inorganic/organic modifier or organosilane as described above is applied by means of liquid and/or vapor phase surface polycondensation in three steps. During the first step of the process a chemical reaction takes place when the molecules of modifier interact with primary silanol groups on the surface of anhydrous silica gel sorbent and covalently bond to it by forming vertical siloxane bonds, while losing corresponding leaving groups. The second step of the process involves hydrolization of the surface when unreacted leaving groups are hydrolyzed in presence of moisture. Thus, secondary silanols (attached to the organosilane molecules) are created. The third step of the process is dehydration to promote polycondensation. During this step the sorbent is cured for several hours at elevated temperature and then at reduced pressure for the crosslinking of sterically favorably located silanols. As a result a horizontal and partially vertical polysiloxane network of bonds is formed with water molecules leaving the surface.

Figure 3:
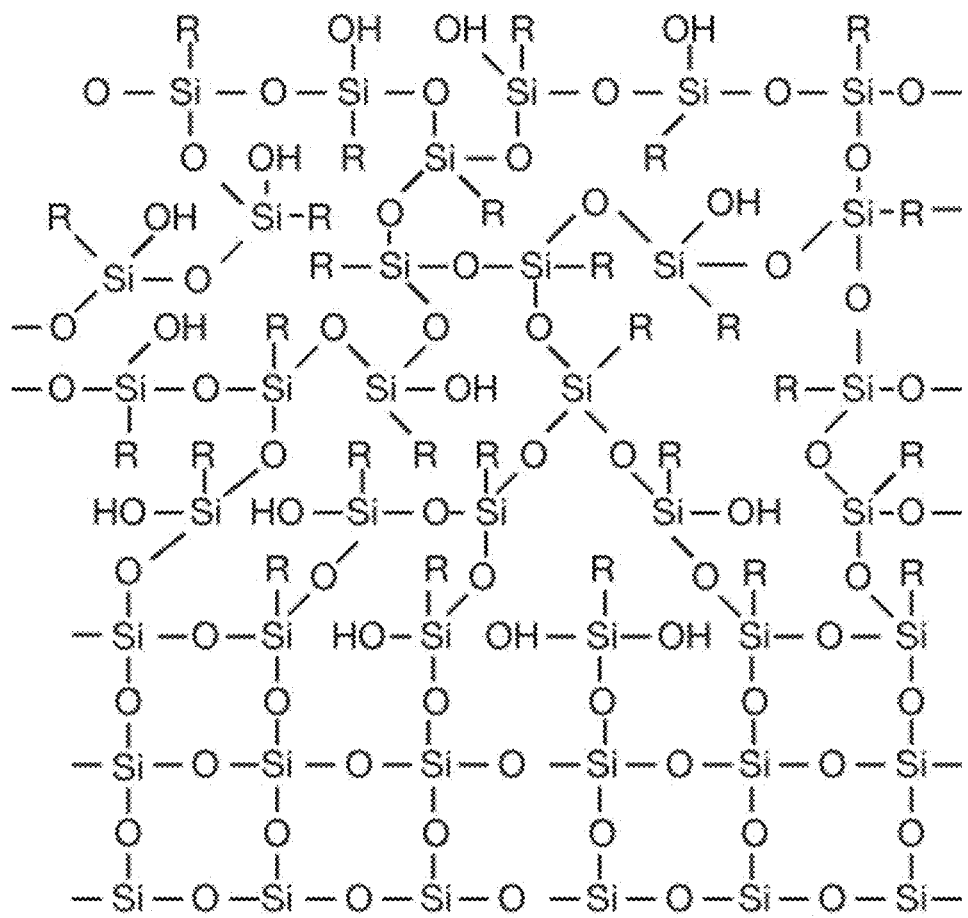
FIG. 3 is a graphical representation of multilayer inorganic/organic surface grafted silica gel.

This process of inorganic/organic grafting is repeated multiple times, for instance 2-15 but preferably 2-4, creating a multilayer inorganic/organic hybridized surface coating shown graphically in FIG. 3. This process results in a higher concentration of organic groups throughout its depth than in the corresponding surface layer of current "pure" hybrid chromatographic particles.

The secondary silanols of the last layer may serve as the points of attachment for further surface modification by commonly employed mono-, di-, or tri-functional organosilanes for chromatographic resins, of the following general formulas $R^1SiX_3$, $R^1R^2SiX_2$, $R^1R_2^2SiX$ respectively, where $R^1$ and $R^2$ are organic ligands. Finally, endcapping is applied by conventional means known within the art.

The process described above is called Templated Multilayer Inorganic/Organic Grafting (TMIOG) and modified silica gel sorbents using this technique can be utilized in many chromatographic techniques such as Liquid Chromatography (LC), including its various forms such as Reversed Phase Chromatography, Normal Phase Chromatography, Gel Filtration Chromatography, Ion-Exchange Chromatography, and Affinity Chromatography, as well as Solid Phase Extraction (SPE), and Flash Chromatography.

Figure 1:
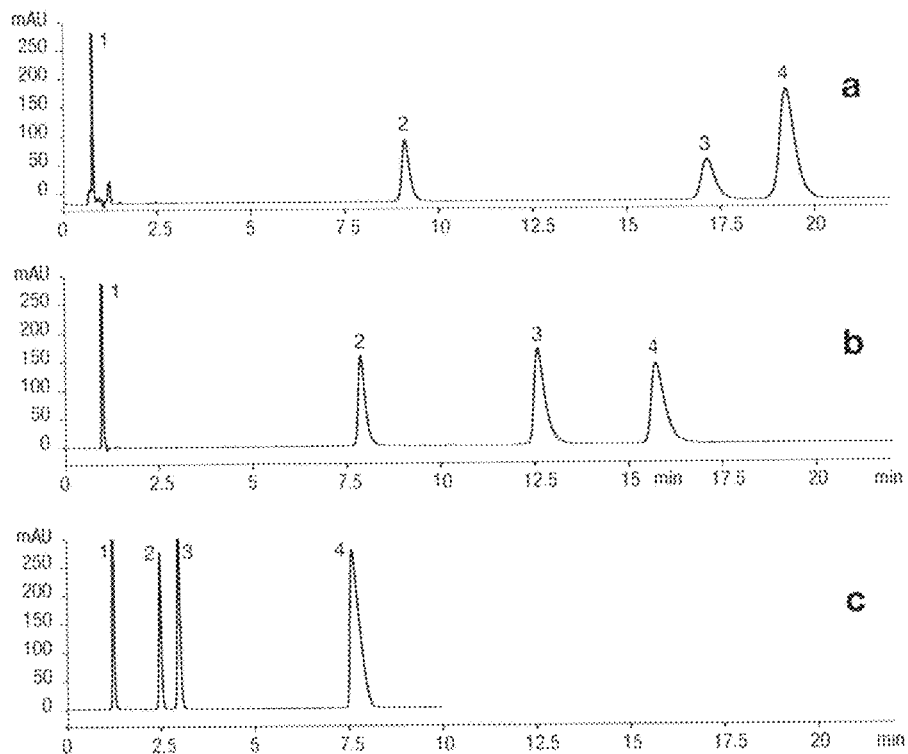
FIG. 1 shows the effect of high pH on retention and selectivity of basic drugs.
Figure 2B:
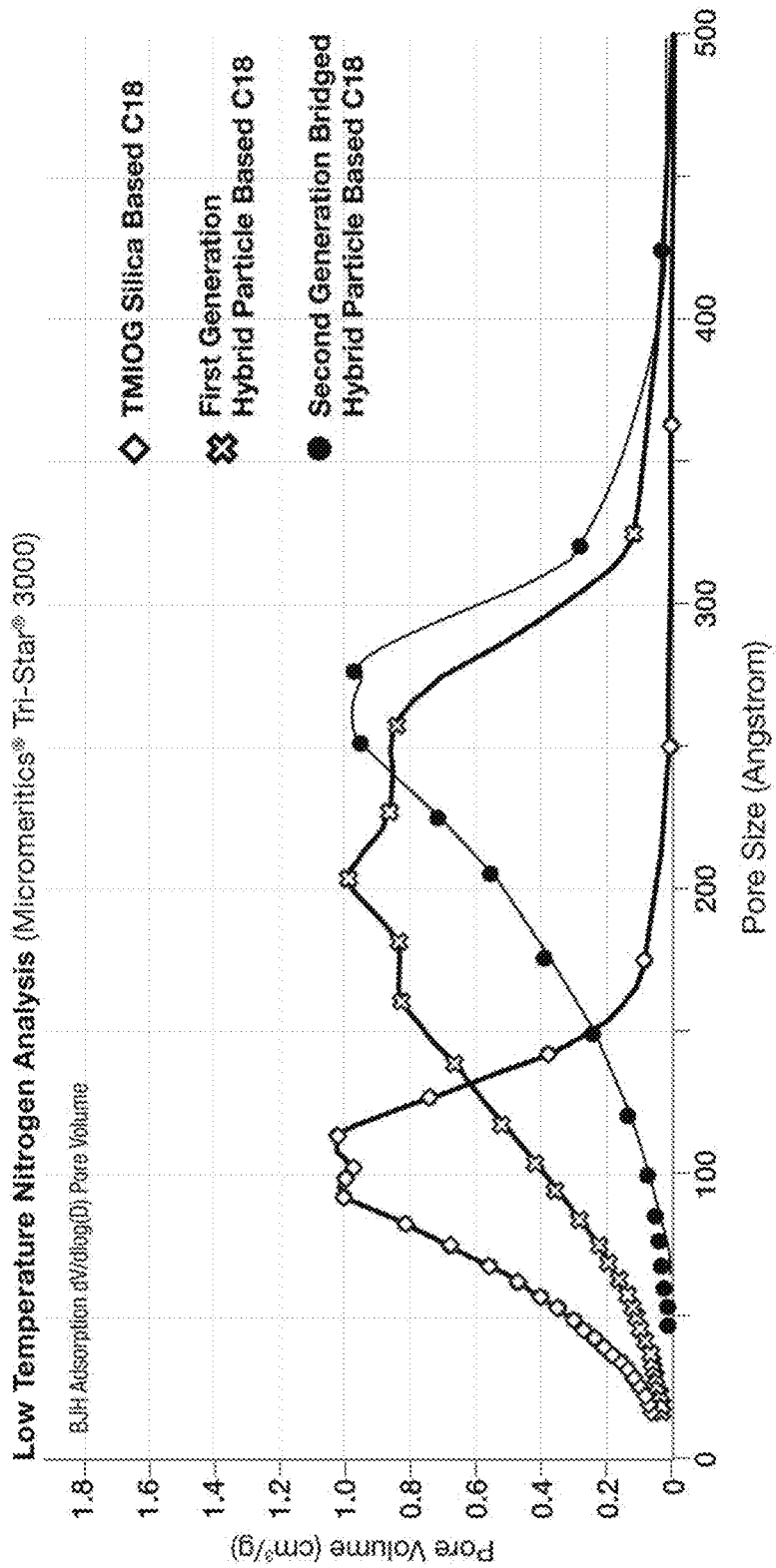
FIG. 2b shows the pore size distribution of TMIOG silica based C18, first generation hybrid particle based C18, and second generation bridged hybrid particle based C18 media.
Figure 4:
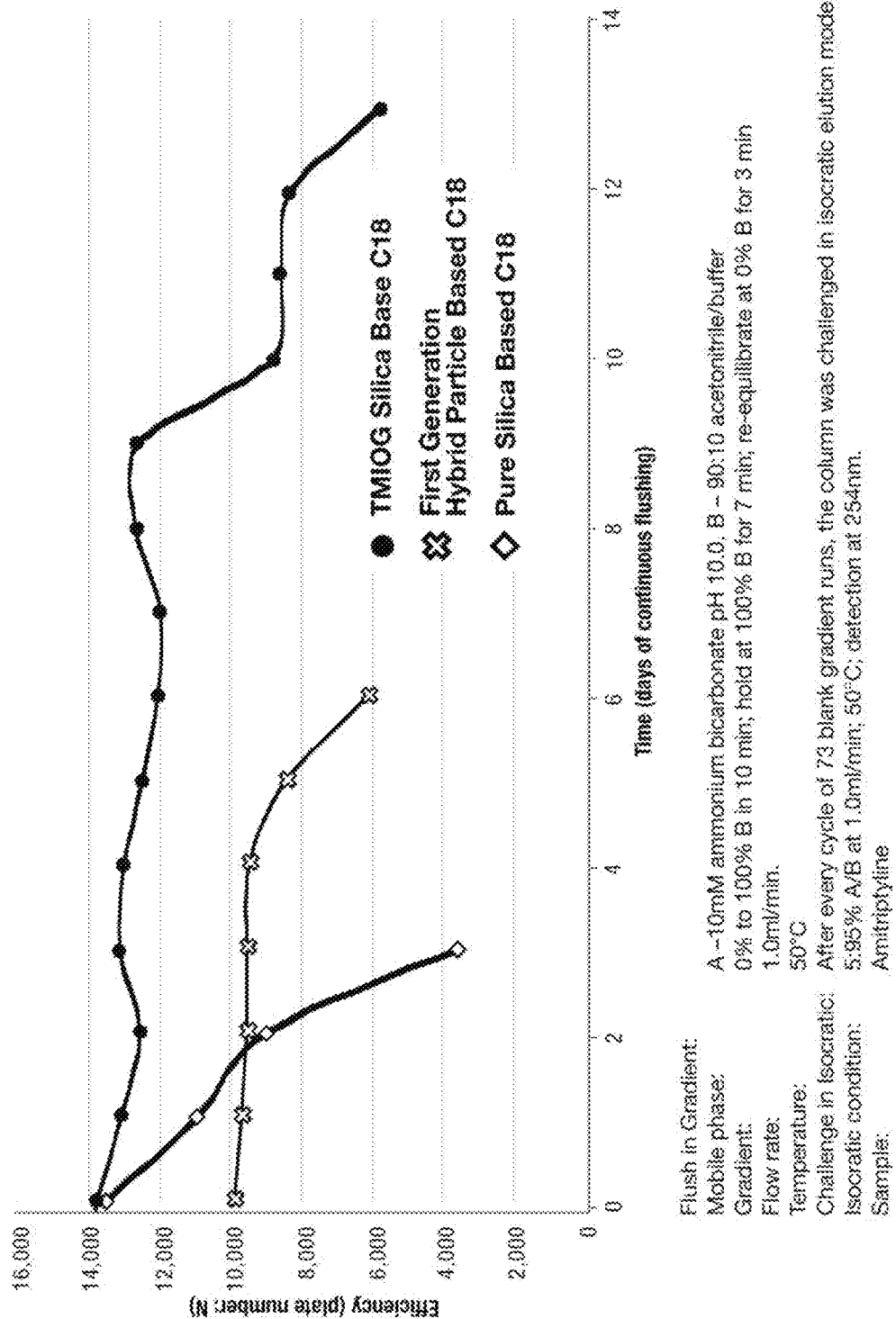
FIG. 4 is a graph showing the stability of TMIOG silica gel based C18 and first generation Hybrid Particle based 18 columns in high pH gradient run conditions.
Figure 5:
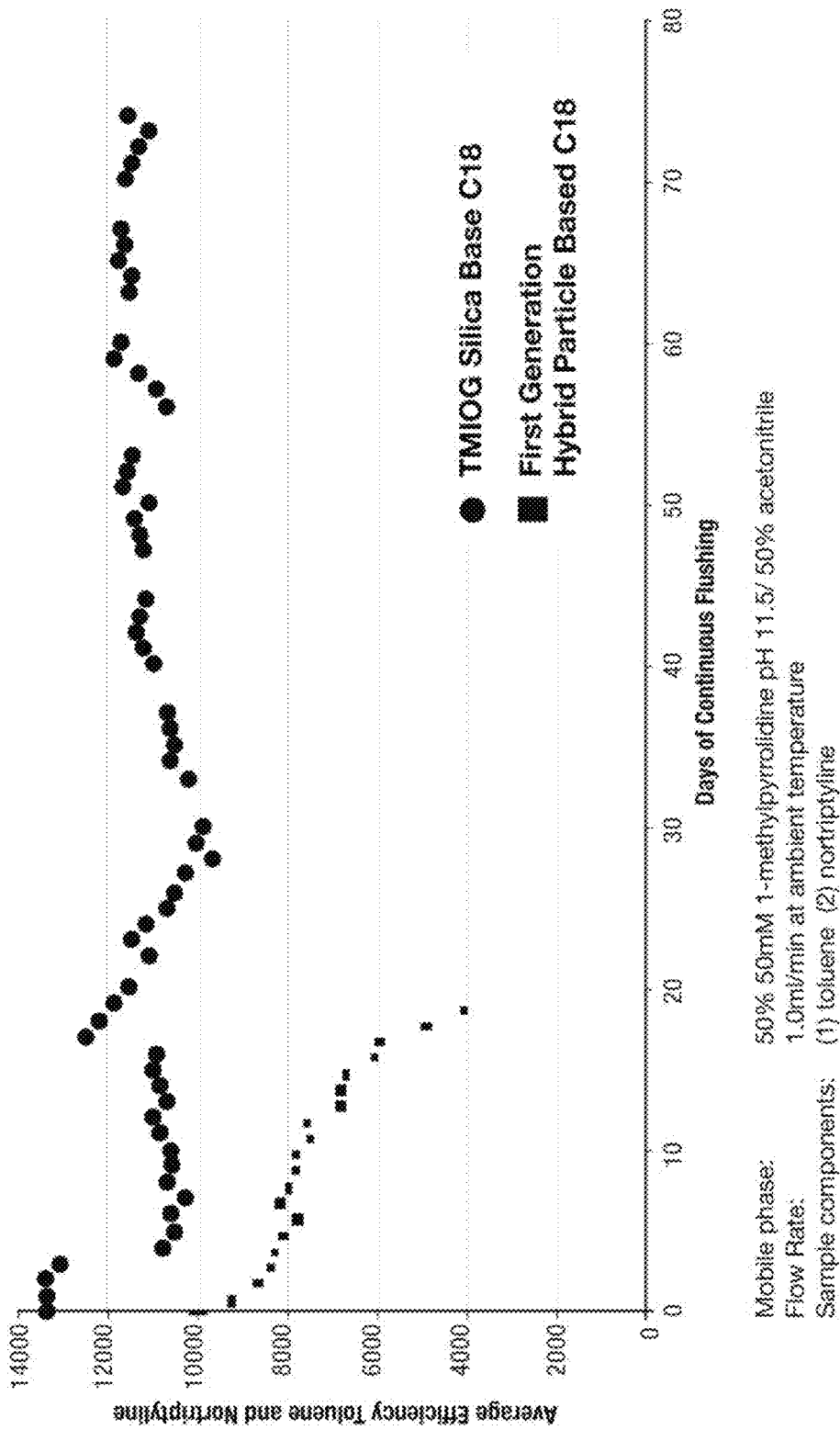
FIG. 5 is a graph showing the stability of TMIOG silica gel based C18 and first generation Hybrid Particle based C 18 columns in high pH isocratic run conditions.

The resulting chromatographic media exhibits a wider pH range and improved pH stability as compared to other silica gel based sorbents, as shown in FIGS. 4 and 5, while retaining all other positive aspects attributed to the silica gel substrate. This type of performance can be explained by the following conclusions:

First of all, by utilizing silica gel morphology as a template (hence the term "templated") the described TMIOG technology produces chromatographic media having narrower pore size distribution than polymer-based or current pure hybrid sorbents (FIGS. 2a, 2b), and yielding packed columns with efficiencies and solute peak shapes comparable to the state-of-the-art silica gel based HPLC columns.

Secondly, preservation of the substrate silica gel's homogeneous and fully coordinated wall (core) structure makes certain that mechanical and structural strength of the sorbent is intact. Employing silica gel substrate in TMIOG technology also provides lower backpressures than in similar particle size polymer or pure hybrid sorbents.

Third, the absence of the isolated silanols adjacent to organic groups in the silica gel wall as opposed to first generation hybrid particles minimizes chances of unexpected secondary interactions.

Fourth, an increased concentration of organic moiety strategically placed on the surface of the silica gel particles where they are most needed, since that is where dissolution of particles at high pH starts, rather than being wastefully scattered throughout the walls of the particle provides the improved pH stability and wide pH range available from the described use of TMIOG technology-based sorbents. In the preferred embodiment, the concentration of C atoms in the 20-angstrom-deep surface layer of TMIOG particles compared to the same layer of first generation pure hybrid particles is 6 times higher. Below is a calculation proving this statement. Current first generation pure hybrid technology utilizes one tri-ethoxymethylsilane [TEOMS] for every two tetraethylorthosilicate [TEOS] molecules, or in another words only ⅓ of the precursor molecules contain methyl group. Meanwhile, in the TMIOG modified surface every molecule has an ethyl group attached to it. As a result, the quantity of C atoms in a first generation Hybrid as compared to TMIOG is ⅓ divided by 2 (methyl as opposed to ethyl group), thus is 6 times lower. Likewise, the concentration of C atoms in the 20-angstrom-deep surface layer in a preferred embodiment of TMIOG particles compared to the same layer of second generation bridged hybrid particles is 3 times higher.

Fifth, most organosilylated chromatographic media are prone to a certain degree of bonded group hydrolysis during use. The level of such hydrolization (bleed, ligand cleavage) depends on employed bonding and endcapping technology. Usually, the endcapping ligands as trimethylsilyl (TMS) are the first to cleave exposing underlying silica gel to a hydrolytic attack with a potential threat of dissolution. The disclosed application of TMIOG technology ensures that even if such cleavage takes place the substrate silica gel is still well protected by multilayer of horizontally and vertically cross-linked network of inorganic/organic coating.

One of the last and most important advantageous aspects of employing Templated Multilayer Organic/Inorganic Grafting modification to chromatographically enhance an existing silica gel based sorbent, as opposed to forming a totally new sorbent by co-polymerizing, is that it can be performed without greatly impacting the specific physiochemical structure of the sorbent. In the present invention, a readily available silica gel based sorbent with desired physiochemical characteristics such as particle size and particle size distribution, pore size and pore size distribution, surface area, or pore volume can be selected and then surface graft modified with a desirable inorganic/organic chemical composition. This type of flexibility tremendously expedites the research and development part of new product design suitable to specific applications.

The present invention may be further illustrated by the following non-limiting examples describing the preparation of TMIOG modified sorbents.

Example 1

Step 1. 55.3 grams of a 5-micrometer, 380 m2/g surface area, 110 angstrom pore size and 1 ml/g pore volume silica gel sorbent was placed into a pre-weighed 500 ml round-bottom tri-neck flask and then into a vacuum oven and dried at 120° C. for at least 2 hours. After release of vacuum the flask with silica in it was weighed again, and plugged. The exact weight of dried silica had been calculated to be 50.0 grams.

Step 2. 250 ml of HPLC grade Toluene was added to the flask and slurred with the silica. Then, 17.4 grams of tris (dimethylamino)ethylsilane (TDMAES) was added to the reaction flask. The whole system was placed into a temperature controlled heating mantle and refluxed for 8 hours with stirring. After cooling down, the reaction slurry was filtered and washed with toluene, methanol, hot water (70° C.) and acetone to remove any unreacted reagents as well as hydrolyze off any unreacted leaving groups. Once washed and filtered, the product was placed in the oven to dry at cure at 80° C. for 12 hours and then in vacuum for another 2 hours at the same temperature. The carbon content of the sorbent had been measured as 3.14% by means of an elemental analyzer.

Step 2 was repeated 1 more time. The final carbon content was measured to be 3.78%.

At this point the sorbent was considered to be TMIOG modified. Then, it underwent further derivatization with octadecylsilane (ODS) ligand and TMS end-capping. Any endcapping procedure is believed suitable for the TMIOG modified product.

Example 2

Step 1. 55.5 grams of a 5-micrometer, 380 m2/g surface area, 110 angstrom pore size and 1 ml/g pore volume silica gel sorbent was placed into a pre-weighed 500 ml round-bottom tri-neck flask and then into a vacuum oven and dried at 120° C. for at least 2 hours. After release of vacuum the flask with silica in it was weighed again, and plugged. The exact weight of dried silica had been calculated to be 51.4 grams.

Step 2. 255 ml of HPLC grade Toluene was added to the flask and slurred with the silica. Then, 20.4 grams of TDMAES was added to the reaction flask. The whole system was placed into a temperature controlled heating mantle and refluxed for 8 hours with stirring. After cooling down, the reaction slurry was filtered and washed with toluene, methanol, hot water (70° C.) and acetone to remove any unreacted reagents as well as hydrolyze off any unreacted leaving groups. Once washed and filtered, the product was placed in the oven to dry at cure at 80° C. for 12 hours and then in vacuum for another 2 hours at the same temperature. The carbon content of the sorbent had been measured as 2.93% by means of an elemental analyzer.

Step 2 was repeated 2 more times. The final carbon content was measured to be 4.77%.

At this point the sorbent was considered to be TMIOG modified. Then, it underwent further derivatization with octadecylsilane (ODS) ligand and TMS end-capping. Any endcapping procedure is believed suitable for the TMIOG modified product.

Example 3

Step 1. 55.0 grams of a 10-micrometer, 380 m2/g surface area, 110 angstrom pore size and 1 ml/g pore volume silica gel sorbent was placed into a pre-weighed 500 ml round-bottom tri-neck flask and then into a vacuum oven and dried at 120° C. for at least 2 hours. After release of vacuum the flask with silica in it was weighed again, and plugged. The exact weight of dried silica had been calculated to be 50.6 grams.

Step 2. 255 ml of HPLC grade Toluene was added to the flask and slurred with the silica. Then, 20.4 grams of ethyltriclorosilane was added to the reaction flask. Next, 25 g of Pyridine was added to the flask. The whole system was placed into a temperature controlled heating mantle and refluxed for 8 hours with stirring. After cooling down, the reaction slurry was filtered and washed with toluene, methanol, and hot water (70° C.) to remove any unreacted reagents, byproducts as well as hydrolyze off any unreacted leaving groups. Once washed and filtered the product was placed in the oven to dry at cure at 80° C. for 12 hours and then in vacuum for another 2 hours at the same temperature. Carbon content of the sorbent had been measured as 3.61% by means of an elemental analyzer.

Step 2 was repeated 2 more times. The final carbon content was measured to be 5.21%.

At this point the sorbent was considered to be TMIOG modified. Then, it underwent further derivatization with octadecylsilane (ODS) ligand and TMS end-capping. Any endcapping procedure is believed suitable for the TMIOG modified product.

Example 4

Step 1. 52.0 grams of a 5-micrometer, 380 m2/g surface area, 110 angstrom pore size and 1 ml/g pore volume silica gel sorbent was placed into a pre-weighed 500 ml round-bottom tri-neck flask and then into a vacuum oven and dried at 120° C. for at least 2 hours. After release of vacuum the flask with silica in it was weighed again, and plugged. The exact weight of dried silica had been calculated to be 49.1 grams.

Step 2. 244 ml of HPLC grade Toluene was added to the flask and slurred with the silica. Then, 17 grams of bistris (dimethylamino)silylethane was added to the reaction flask. The whole system was placed into a temperature controlled heating mantle and refluxed for 8 hours with stirring. After cooling down, the reaction slurry was filtered and washed with toluene, methanol, and hot water (70° C.) to remove any unreacted reagents as well as hydrolyze off any unreacted leaving groups. Once washed and filtered, the product was placed in the oven to dry at cure at 80° C. for 12 hours and then in vacuum for another 2 hours at the same temperature. Carbon content of the sorbent was measured as 2.35% by means of an elemental analyzer.

Step 2 was repeated 3 more times. The final carbon content was measured to be 3.55%.

At this point the sorbent was considered to be TMIOG modified. Then, it underwent further derivatization with octadecylsilane (ODS) ligand and TMS end-capping. Any endcapping procedure is believed suitable for the TMIOG modified product.

Example 5

Step 1. 10.23 grams of a 5-micrometer, 380 m2/g surface area, 110 angstrom pore size and 1 ml/g pore volume silica gel sorbent was placed into a pre-weighed 250 ml round-bottom tri-neck flask and then into a vacuum oven and dried at 120° C. for at least 2 hours. After release of vacuum the flask with silica in it was weighed again, and plugged.

Step 2. 51 ml of HPLC grade Toluene was added to the flask and slurred with the silica. Then, 3.56 grams of 1,3-bis (trichlorosilyl)propane was added to the reaction flask. The whole system was placed into a temperature controlled heating mantle and refluxed for 3 hours with stirring. After cooling down, the reaction slurry was filtered and washed with toluene, methanol, and hot water (70° C.) to remove any unreacted reagents as well as hydrolyze off any unreacted leaving groups. Once washed and filtered, the product was placed in the oven to dry at cure at 80° C. for 12 hours and then in vacuum for another 2 hours at the same temperature. Carbon content of the sorbent was measured as 2.66% by means of an elemental analyzer.

Step 2 was repeated 2 more times. The final carbon content was measured to be 4.32%.

At this point the sorbent was considered to be TMIOG modified. Then, it underwent further derivatization with octadecylsilane (ODS) ligand and TMS end-capping. Any endcapping procedure is believed suitable for the TMIOG modified product.

Example 6

Step 1. 10.28 grams of a 5-micrometer, 380 m2/g surface area, 110 angstrom pore size and 1 ml/g pore volume silica gel sorbent was placed into a pre-weighed 250 ml round-bottom tri-neck flask and then into a vacuum oven and dried at 120° C. for at least 2 hours. After release of vacuum the flask with silica in it was weighed again, and plugged.

Step 2. 52 ml of HPLC grade Toluene was added to the flask and slurred with the silica. Then 3.58 grams of bis(triethoxysilyl)octane was added to the reaction flask. The whole system was placed into a temperature controlled heating mantle and refluxed for 3 hours with stirring. After cooling down, the reaction slurry was filtered and washed with toluene, methanol, and hot water (70° C.) to remove any unreacted reagents as well as hydrolyze off any unreacted leaving groups. Once washed and filtered, the product was placed in the oven to dry at cure at 80° C. for 12 hours and then in vacuum for another 2 hours at the same temperature.

Step 2 was repeated 2 more times. The final carbon content was measured to be 2.51%.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of forming a silica gel sorbent for use in chromatographic separations that has been chemically modified by surface polycondensation of an inorganic/organic modifier comprising the steps:
   a. reacting the anhydrous silica gel sorbent with the inorganic/organic modifier, wherein the modifier has the formula $R^1{}_aR^2{}_bSiX_{4-a-b}$ or $R(R^1{}_aSiX_{3-a})_n$, wherein R is a substituted aliphatic, cyclic, arylic or aromatic organic moiety containing 1 to 8 carbon atoms or an unsubstituted aliphatic, cyclic, arylic or aromatic organic moiety containing 1 to 8 carbon atoms, $R^1$ and $R^2$ are organic ligands containing 1 to 4 carbon atoms, X is a leaving group attached to the silicon atom, a and b are positive integers equal to 0 or 1, a plus b equals to 1 or 2 but never 0, and n is a positive integer between 2 to 8;
   b. hydrolyzing any unreacted leaving groups; and
   c. dehydrating the sorbent.

2. The method of claim 1, wherein steps a, b, and c are performed 2 to 15 times.

3. The method of claim 2, wherein steps a, b, and c are performed 2 to 4 times.

4. The method of claim 1, wherein R is an unsubstituted aliphatic, cyclic, arylic or aromatic organic moiety containing 1 to 8 carbon atoms.

5. The method of claim 4, wherein R is an unsubstituted, saturated aliphatic organic moiety containing 1 to 8 carbon atoms.

6. The method of claim 1, wherein R contains 1 to 3 carbon atoms.

7. The method of claim 1, wherein $R^1$ and $R^2$ contain 1 to 2 carbon atoms.

8. The method of claim 1, wherein X is selected from the group consisting of Cl, $OCH_3$, $OC_2H_5$, $(CH_3)_2N$, $(CH_3CH_2)_2N$, I, Br, CN, $OOCH_3$, $O(CO)CH_3$, and $O_3SCF_3$.

9. The method of claim 1, wherein n is equal to 2.

* * * * *